United States Patent
Suto et al.

(10) Patent No.: US 8,363,970 B2
(45) Date of Patent: Jan. 29, 2013

(54) IMAGE PROCESSING APPARATUS AND LEARNING APPARATUS FOR CONVERTING A FIRST IMAGE INTO A SECOND IMAGE HAVING HIGHER IMAGE QUALITY THAN THE FIRST IMAGE

(75) Inventors: Yasuhiro Suto, Tokyo (JP); Tetsujiro Kondo, Tokyo (JP); Hisakazu Shiraki, Kanagawa (JP); Takahiro Nagano, Kanagawa (JP); Noriaki Takahashi, Tokyo (JP)

(73) Assignee: Sony Corporation, Tokyo (JP)

( * ) Notice: Subject to any disclaimer, the term of this patent is extended or adjusted under 35 U.S.C. 154(b) by 947 days.

(21) Appl. No.: 12/326,413

(22) Filed: Dec. 2, 2008

(65) Prior Publication Data

US 2009/0161984 A1   Jun. 25, 2009

(30) Foreign Application Priority Data

Dec. 21, 2007   (JP) .................... 2007-330452

(51) Int. Cl.
*G06K 9/40* (2006.01)
(52) U.S. Cl. ...................... 382/254; 382/155
(58) Field of Classification Search ............ 345/428; 382/160, 204, 238, 255, 276, 305; 706/45
See application file for complete search history.

(56) References Cited

U.S. PATENT DOCUMENTS

| 7,085,318 | B2 * | 8/2006 | Kondo et al. | 375/240.01 |
| 7,450,764 | B2 * | 11/2008 | Kondo et al. | 382/204 |
| 7,460,178 | B2 * | 12/2008 | Kondo et al. | 348/576 |
| 7,814,039 | B2 * | 10/2010 | Kondo et al. | 706/45 |
| 7,853,099 | B2 * | 12/2010 | Shinmei et al. | 382/305 |
| 7,876,323 | B2 * | 1/2011 | Kondo | 345/428 |
| 7,903,890 | B2 * | 3/2011 | Nagano et al. | 382/238 |
| 7,940,993 | B2 * | 5/2011 | Nagano et al. | 382/255 |
| 2007/0110333 | A1 * | 5/2007 | Kondo et al. | 382/276 |
| 2009/0161948 | A1 * | 6/2009 | Takahashi et al. | 382/160 |
| 2009/0161977 | A1 * | 6/2009 | Shiraki et al. | 382/255 |

FOREIGN PATENT DOCUMENTS

| JP | 2007-116292 | 5/2007 |
| JP | 2007-189589 | 7/2007 |

OTHER PUBLICATIONS

U.S. Appl. No. 12/277,591, Nov. 25, 2008, Shiraki, et al.
U.S. Appl. No. 12/327,980, Dec. 4, 2008, Nagano, et al.
Japanese Office Action issued Dec. 27, 2011 in patent application No. 2007-330452.

\* cited by examiner

*Primary Examiner* — Vu Le
*Assistant Examiner* — Xuemei Chen
(74) *Attorney, Agent, or Firm* — Oblon, Spivak, McClelland, Maier & Neustadt, L.L.P.

(57) ABSTRACT

An image processing apparatus for converting a first image into a second image having higher image quality than the first image. The image processing apparatus including first pixel value extracting means for extracting plural pixel values within the first image and estimate noise amount arithmetically operating means for obtaining estimate noise amounts for the plural pixel values. The image processing apparatus also including processing coefficient generating means for generating second processing coefficients in accordance with an arithmetic operation for first processing coefficients and the estimate noise amounts, second pixel value extracting means for extracting a plurality of pixel values, and predicting means for generating a pixel value of the pixel of interest.

12 Claims, 9 Drawing Sheets

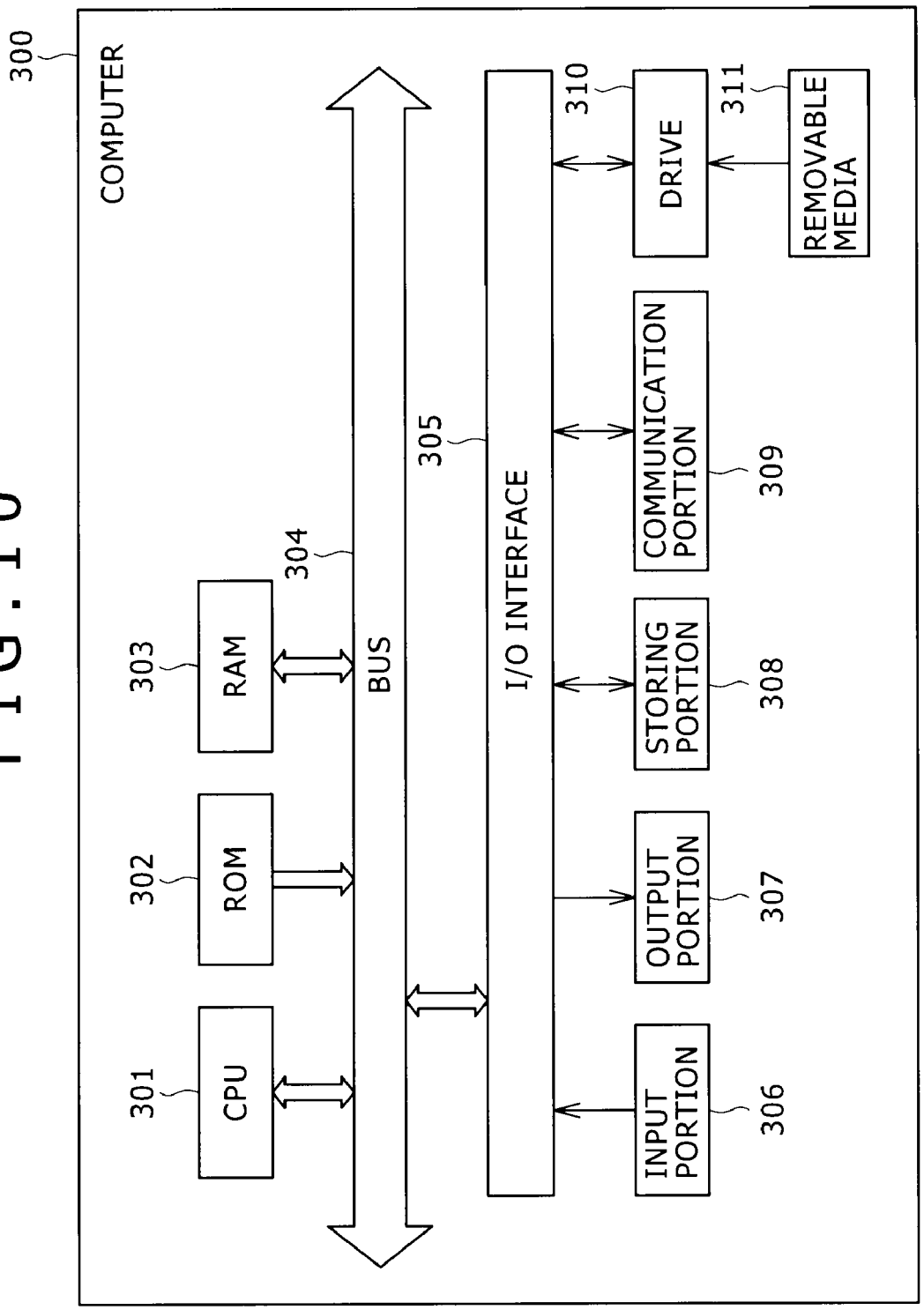

IMAGE PROCESSING APPARATUS AND LEARNING APPARATUS FOR CONVERTING A FIRST IMAGE INTO A SECOND IMAGE HAVING HIGHER IMAGE QUALITY THAN THE FIRST IMAGE

CROSS REFERENCES TO RELATED APPLICATIONS

The present invention contains subject matter related to Japanese Patent Application JP 2007-330452 filed in the Japan Patent Office on Dec. 21, 2007, the entire contents of which being incorporated herein by reference.

BACKGROUND OF THE INVENTION

1. Field of the Invention

The present invention relates to an image processing apparatus, an image processing method, and a program for use therein, and a learning apparatus, and more particularly to an image processing apparatus and an image processing method each of which is capable of removing a noise, which is generally generated and which has luminance dependency, from a video signal corresponding to an image, and a program for use therein, and a learning apparatus.

2. Description of the Related Art

In related art, in noise removing processing for removing a noise from a video signal corresponding to an image, the noise is treated as a white color, and pixel values of the peripheral pixels are added to one another, thereby removing the noise from a video signal corresponding to an image.

On the other hand, in recent years, it has been devised in the noise removing processing that the noise is assumed to have a color because there is a deviation in color of the noise, and thus the noise is removed with a high degree of accuracy as compared with the case where the noise is treated as the white color.

For example, it has been devised in the noise removing processing that black pixel signals generated in black pixels obtained by light-shielding an opening portion are subtracted from pixel signals outputted from the effective pixels, respectively, thereby removing a fixed pattern noise (FPN) with which the pixel signals are mixed due to a manufacturing error. This technique, for example, is descried in Japanese Patent Laid-Open No. 2007-116292. In that noise removing processing, in order to remove the noise due to the manufacturing error, the black pixel signals need to be detected every product.

SUMMARY OF THE INVENTION

On the other hand, it has not been devised in the noise removing processing to remove a noise which, for example, does not depend on any of the manufacturing processes, but has luminance dependency which an image sensor itself generally has (hereinafter referred to as "a luminance dependency noise").

The present invention has been made in the light of such circumferences, and it is therefore desirable to provide an image processing apparatus and an image processing method each of which is capable of removing a noise, which is generally generated and which has luminance dependency, from a video signal corresponding to an image, and a program for use therein, and a learning apparatus.

In order to attain the desire described above, according to an embodiment of the present invention, there is provided an image processing apparatus for converting a first image into a second image having higher image quality than that of the first image, including: a first pixel value extracting section for extracting a plurality of pixel values, within the first image, corresponding to a position of a pixel of interest, and peripheral positions of the position of the pixel of interest within the second image; an estimate noise amount arithmetically operating section for obtaining estimate noise amounts for the plurality of pixel values extracted by the first pixel value extracting section, respectively; a processing coefficient generating section for generating second processing coefficients in accordance with an arithmetic operation for first processing coefficients previously learned from a normal equation, and the estimate noise amounts obtained for the plurality of pixel values, respectively, within the first image, the normal equation being obtained based on a relational expression for generating a teacher image corresponding to the second image having higher image quality than that of a student image in accordance with an arithmetic operation for the second processing coefficients obtained in accordance with estimate noise amounts about the pixel values within the student image corresponding to the first image, and the first processing coefficients, and the student image; a second pixel value extracting section for extracting a plurality of pixel values, within the first image, corresponding to a position of a pixel of interest, and peripheral positions of the position of the pixel of interest within the second image; and a predicting section for generating a pixel value of the pixel of interest within the second image in accordance with an arithmetic operation for the plurality of pixel values extracted by the second pixel value extracting section, and the second processing coefficients.

According to another embodiment of the present invention, there is provided an image processing method for use in an image processing apparatus for converting a first image into a second image having higher image quality than that of the first image, the image processing method including the steps of: extracting a plurality of pixel values, within the first image, corresponding to a position of a pixel of interest, and peripheral positions of the position of the pixel of interest within the second image; obtaining estimate noise amounts for the plurality of pixel values, respectively; obtaining second processing coefficients in accordance with an arithmetic operation for first processing coefficients previously learned from a normal equation, and the estimate noise amounts obtained for the plurality of pixel values, respectively, within the first image, the normal equation being obtained based on a relational expression for generating a teacher image corresponding to the second image having higher quality than that of a student image in accordance with an arithmetic operation for the second processing coefficients obtained in accordance with estimate noise amounts about the pixel values within the student image corresponding to the first image, and the first processing coefficients, and the student image; extracting a plurality of pixel values, within the first image, corresponding to a position of a pixel of interest, and peripheral positions of the position of the pixel of interest within the second image; and generating a pixel value of the pixel of interest within the second image in accordance with an arithmetic operation for the plurality of pixel values thus extracted, and the second processing coefficients.

According to the embodiments of the present invention described above, the plurality of pixel values, within the first image, corresponding to the position of the pixel of interest, and the peripheral positions of the position of the pixel of interest within the second image having the higher image quality than that of the first image are extracted. The estimate noise amounts are obtained with respect to the plurality of pixel values thus extracted, respectively. The second processing coefficients are obtained in accordance with the arithmetic operation for the first processing coefficients previously learned from the normal equation, and the estimate noise amounts obtained for the plurality of pixel values, respectively, within the first image. In this case, the normal equation is obtained based on the relational expression for generating the teacher image corresponding to the second image having the higher image quality than that of the student image in accordance with the arithmetic operation for the second processing coefficients obtained in accordance with the estimate noise amounts about the pixel values, within the student image, corresponding to the first image and the first processing coefficients, and the student image. In addition, the plurality of pixel values, within the first image, corresponding to the position of the noticed image, and the peripheral positions of the position of the noticed image within the second image are extracted. Also, the pixel value of the pixel of interest within the second image is generated in accordance with the arithmetic operation for the plurality of pixel values thus extracted, and the second processing.

According to still another embodiment of the present invention, there is provided a program in accordance with which a computer executes image processing for converting a first image into a second image having higher image quality than that of the first image, the program including the steps of: extracting a plurality of pixel values, within the first image, corresponding to a position of a pixel of interest, and peripheral positions of the position of the pixel of interest within the second image; obtaining estimate noise amounts for the plurality of pixel values, respectively; obtaining second processing coefficients in accordance with an arithmetic operation for first processing coefficients previously learned from a normal equation, and the estimate noise amounts obtained for the plurality of pixel values, respectively, within the first image, the normal equation being obtained based on a relational expression for generating a teacher image corresponding to the second image having higher quality than that of a student image in accordance with an arithmetic operation for the second processing coefficients obtained in accordance with estimate noise amounts about the pixel values within the student image corresponding to the first image, and the first processing coefficients, and the student image; extracting a plurality of pixel values, within the first image, corresponding to a position of a pixel of interest, and peripheral positions of the position of the pixel of interest within the second image; and generating a pixel value of the pixel of interest within the second image in accordance with an arithmetic operation for the plurality of pixel values thus extracted, and the second processing coefficients.

According to yet another embodiment of the present invention, there is provided a learning apparatus, including: a normal equation generating section for obtaining estimate noise amounts from pixel values within a student image containing therein a noise having noise dependency, obtaining second processing coefficients in accordance with an arithmetic operation for the estimate noise amounts, and first processing coefficients, and generating a normal equation by using the pixel values of the student image, and pixel values of the teacher image, in order to solve a relational expression for generating the teacher image having higher image quality than that of the student image, in accordance with an arithmetic operation for the second processing coefficients and the student image; and a coefficient generating section for generating the first processing coefficients by solving the normal equation.

According to the embodiments of the present invention described above, the estimate noise amounts are obtained from the pixel values within the student image containing therein the noise having the luminance dependency. The second processing coefficients are obtained in accordance with the arithmetic operation for the estimate noise amounts, and the first processing coefficients. In addition, the normal equation is generated by using the pixel values of the student image, and the pixel values of the student image, in order to solve the relational expression for generating the teacher image having the higher image quality than that of the student image, in accordance with the arithmetic operation for the second processing coefficients and the student image. Also, the first processing coefficients are generated by solving the normal equation.

As set forth hereinabove, according to the present invention, the noise which is generally generated and which has the luminance dependency can be removed from the video signal corresponding to the image.

In addition, it is possible to generate the processing coefficients for removing the noise which is generally generated and which has the luminance dependency from the video signal corresponding to the image.

BRIEF DESCRIPTION OF THE DRAWINGS

FIG. 10 is a block diagram showing a configuration of hardware of a computer.

DETAILED DESCRIPTION OF THE PREFERRED EMBODIMENT

Figure 1:
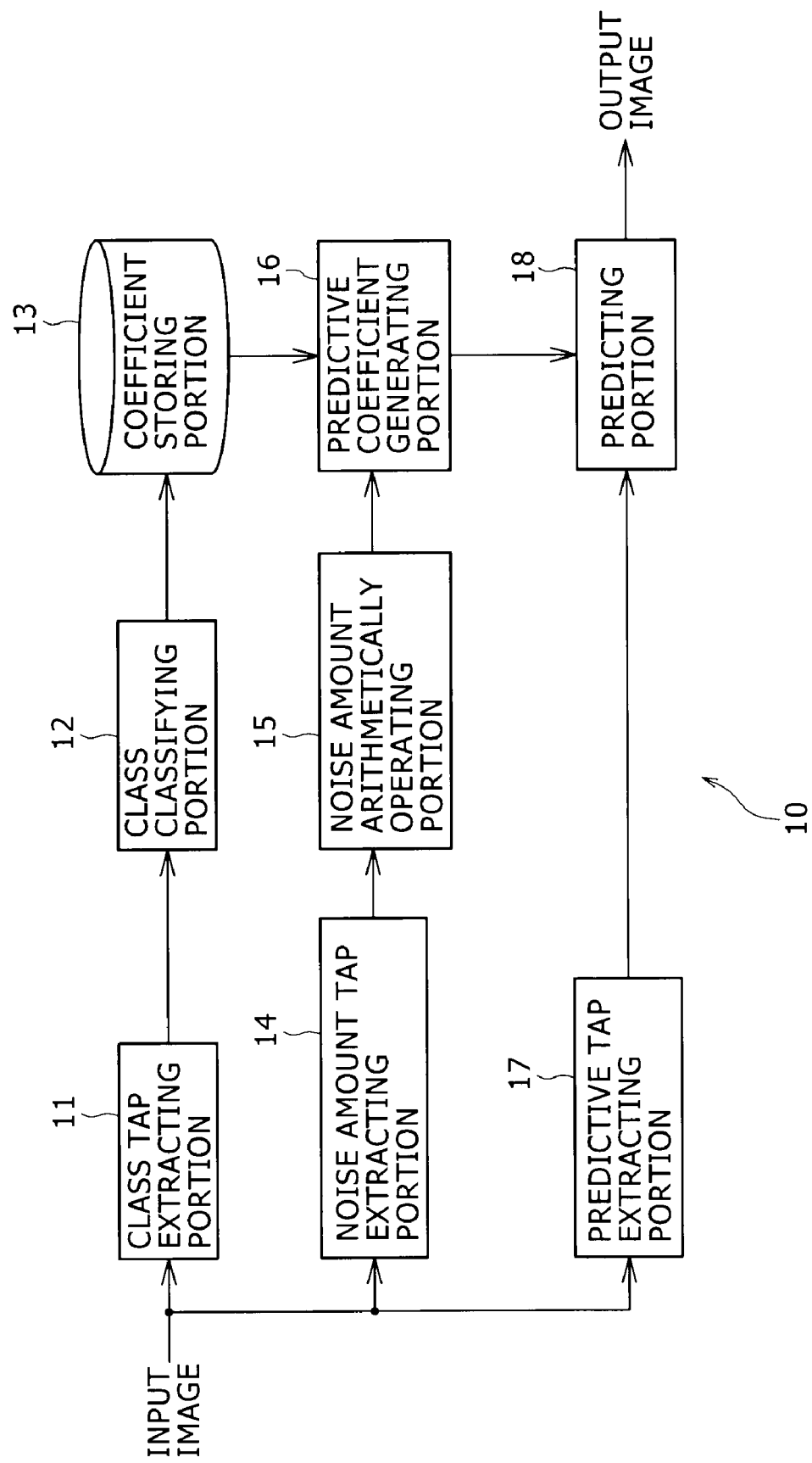
FIG. 1 is a block diagram showing a configuration of an image processing apparatus according to an embodiment of the present invention.

FIG. 1 is a block diagram showing a configuration of an image processing apparatus 10 according to an embodiment of the present invention.

The image processing apparatus 10 shown in FIG. 1 is composed of a class tap extracting portion 11, a class classifying portion 12, a coefficient storing portion 13, a noise amount tap extracting portion 14, a noise amount arithmetically operating portion 15, a predictive coefficient generating portion 16, a predictive tap extracting portion 17, and a predicting portion 18.

The image processing apparatus 10 executes class classifying adaptation processing. In the class classifying adaptation processing, a class for a pixel of interest in an output image which will be generated after this is generated, and predictive coefficients of the output image having higher image quality than that of an input image are generated from the input image by using predictive coefficients obtained based on a processing coefficient of the class, and an estimate value for an amount of noise as a variance value of a luminance dependency noise of the input image (hereinafter referred to as "an estimate noise amount"), and the input image.

It is noted that the processing coefficients used in the class classifying adaptation processing executed by the image processing apparatus 10, for example, is obtained from learning (its details will be described later) using an image containing therein the luminance dependency noise, and an image from which the luminance dependency noise is removed. Therefore, the image processing apparatus 10 can generate an image, having high image quality, from which the luminance dependency noise is removed by executing the class classifying adaptation processing. From this, the class classifying adaptation processing executed by the image processing apparatus 10 can be the as noise removing processing for removing the luminance dependency noise from the input image as it were.

In the image processing apparatus 10 shown in FIG. 1, the class tap extracting portion 11 successively determines pixels composing an output image (this output image is one which will be generated after this and does not exist at the current stage, and thus is virtually supposed) as pixels of interest. The class tap extracting portion 11 extracts pixel values of a plurality of pixels, within the input image, corresponding to a position of the pixel of interest, and peripheral positions of the position of the pixel of interest as a class tap from the input image. In this case, the pixel values of the plurality of pixels within the input image are used to classify the pixels of interest into classes. The class tap extracting portion 11 supplies the class tap to the class classifying portion 12.

The class classifying portion 12 classifies the pixels of interest into classes in correspondence to the feature of the class tap supplied thereto from the class tap extracting portion 11, thereby generating the classes for the pixels of interest. Adaptive dynamic range coding (ADRC) or the like, for example, can be adopted as a method of classifying the pixels of interest into the classes. With a method using the ADRC, the pixel values composing the class tap are ADRC-processed, and the classes of the pixels of interest are determined in accordance with ADRC codes obtained as the result of executing the ADRC processing. As a result, the pixels of interest are classified into the classes in accordance with correlation (waveform) of the class tap.

Note that, in K-bit ADRC, for example, a maximum value MAX and a minimum value MIN of the pixel values composing the class tap are detected. DR=MAX−MIN is set as a local dynamic range of a set of a plurality of pixel values composing the class tap. Also, each of the plurality of pixel values as the class tap is re-quantized into K-bits based on the dynamic range DR. That is to say, the minimum value MIN is subtracted from each of the pixel values as the class tap, and each of the resulting values obtained from the subtraction is divided by $DR/2^K$ (quantized). Also, a bit string which is obtained by arranging the K-bit data, as the class tap, obtained in the manner described above in the predetermined order is set as the ADRC code.

Therefore, when the class tap, for example, is subjected to 1-bit ADRC processing, after the minimum value MIN is subtracted from each of the pixel values as the class tap is divided by ½ of a difference between the maximum value MAX and the minimum value MIN (rounding-down of a fractional part). As a result, each data is set as 1 bit (binarized). Also, a bit string obtained by arranging the data of 1 bit in the predetermined order is set as the ADRC code. The data on the classes for the pixels of interest generated by the class classifying portion are supplied to the coefficient storing portion 13.

The coefficient storing portion 13 stores therein the optimal processing coefficients for the classes obtained from the learning which will be described later. The coefficient storing portion 13 reads out the processing coefficients corresponding to the classes the data on which is supplied from the class classifying portion 12, and supplies the processing coefficients thus read out to the predictive coefficient generating portion 16.

The noise amount tap extracting portion 14 successively determines the pixels composing the output image as the pixels of interest similarly to the case of the class tap extracting portion 11. The noise amount tap extracting portion 14 extracts the pixel values of the plurality of pixels, within the input image, corresponding to the position of the pixel of interest, and the peripheral positions of the position of the pixel of interest as the noise amount tap from the input image. In this case, the pixel values of the plurality of pixels within the input image are used to arithmetically operate the estimate noise amount corresponding to the pixel of interest. The noise amount tap extracting portion 14 supplies the noise amount tap to the noise amount arithmetically operating portion 15.

The noise amount arithmetically operating portion 15 arithmetically operates the estimate noise amount corresponding to the pixel of interest from the noise amount tap supplied thereto from the noise amount tap extracting portion 14, and supplies the resulting estimate noise amount to the predictive coefficient generating portion 16.

The predictive coefficient generating portion 16 carries out a predetermined matrix arithmetic operation by using the processing coefficients supplied thereto from the coefficient storing portion 13, and the estimate noise amount supplied thereto from the noise amount arithmetically operating portion 15, thereby generating the predictive coefficients. The predictive coefficient generating portion 16 supplies the predictive coefficients thus generated to the predicting portion 18.

The predictive tap extracting portion 17 successively determines the pixels composing the output image as the pixels of interest similarly to the case of each of the class tap extracting portion 11 and the noise amount tap extracting portion 14. The predictive tap extracting portion 17 extracts the pixel values of the plurality of pixels, within the input image, corresponding to the position of the pixel of interest, and the peripheral positions of the position of the pixel of interest as the predictive tap from the input image. In this case, the pixel values of the plurality of pixels within the input image are used to predict the pixels of interest. Also, the predictive tap extracting portion 17 supplies the predictive tap thus extracted to the predicting portion 18.

The predicting portion 18 carries out the predictive arithmetic operation for predicting the pixel of interest by using the predictive coefficients supplied thereto from the predictive coefficient generating portion 16, and the predictive tap supplied thereto from the predictive tap extracting portion 17. As a result, the predicting portion 18 generates the predictive value of the pixel value of the pixel of interest as the pixel value of the pixel of interest composing the output image. Also, the predicting portion 18 outputs the output image composed of the pixel values obtained from the predictive arithmetic operation.

Next, an arithmetic operation for the estimate noise amount by the noise amount arithmetically operating portion 15 shown in FIG. 1 will be described with reference to FIG. 2.

Figure 2:
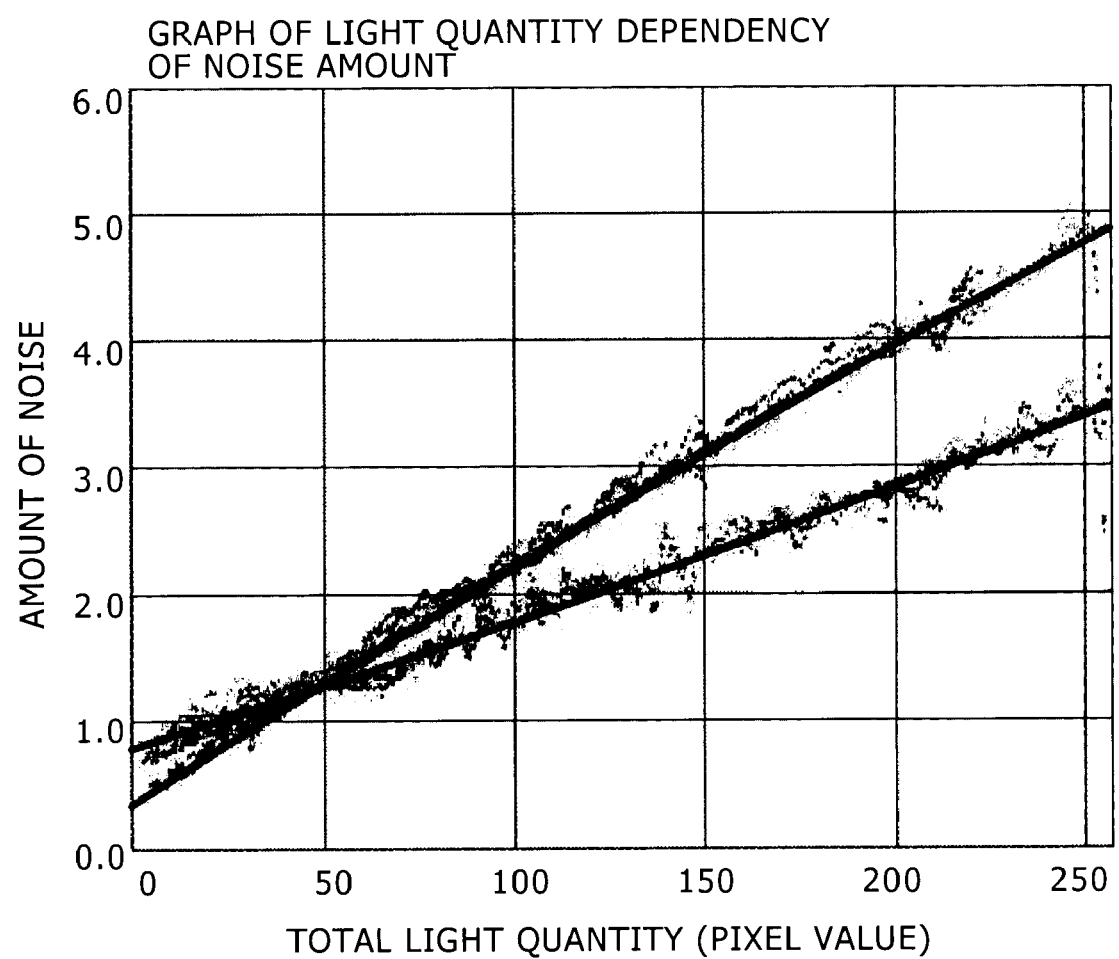
FIG. 2 is a graph showing light quantity dependency of amounts of noises which two kinds of image sensors have, respectively.

A graph of FIG. 2 shows light quantity (luminance) dependency of amounts of noises which two kinds of image sensors have, respectively. It is noted that in FIG. 2, an axis of abscissa represents a total light quantity, that is, a pixel value, and an axis of ordinate represents an amount of noise.

As shown in FIG. 2, the amounts of noises which the two kinds of image sensors have, respectively, have the luminance dependency. Thus, the amount of noise a can be expressed in the form of a quadratic expression of a true value L of the pixel value given by Expression (1):

$$\sigma^2 = aL^2 + bL + c \quad (1)$$

where a, b and c are parameters inherent in the image sensor, respectively.

According to Expression (1), the amount of noise of the pixel corresponding to the true value L of the pixel value can be arithmetically operated from the true value L of the pixel value. Therefore, the noise amount arithmetically operating portion 15 may obtain the amount of noise by carrying out the arithmetic operation for Expression (1). Actually, however, it is impossible to acquire the pixel value in which the true value of the pixel value, that is, the luminance dependency noise is not contained. For this reason, the estimate noise amount σ' is arithmetically operated by carrying out the arithmetic operation for Expression (2) by using a pixel value L' containing therein the noise:

$$\sigma'^2 = aL'^2 + bL' + c \quad (2)$$

Figure 3:
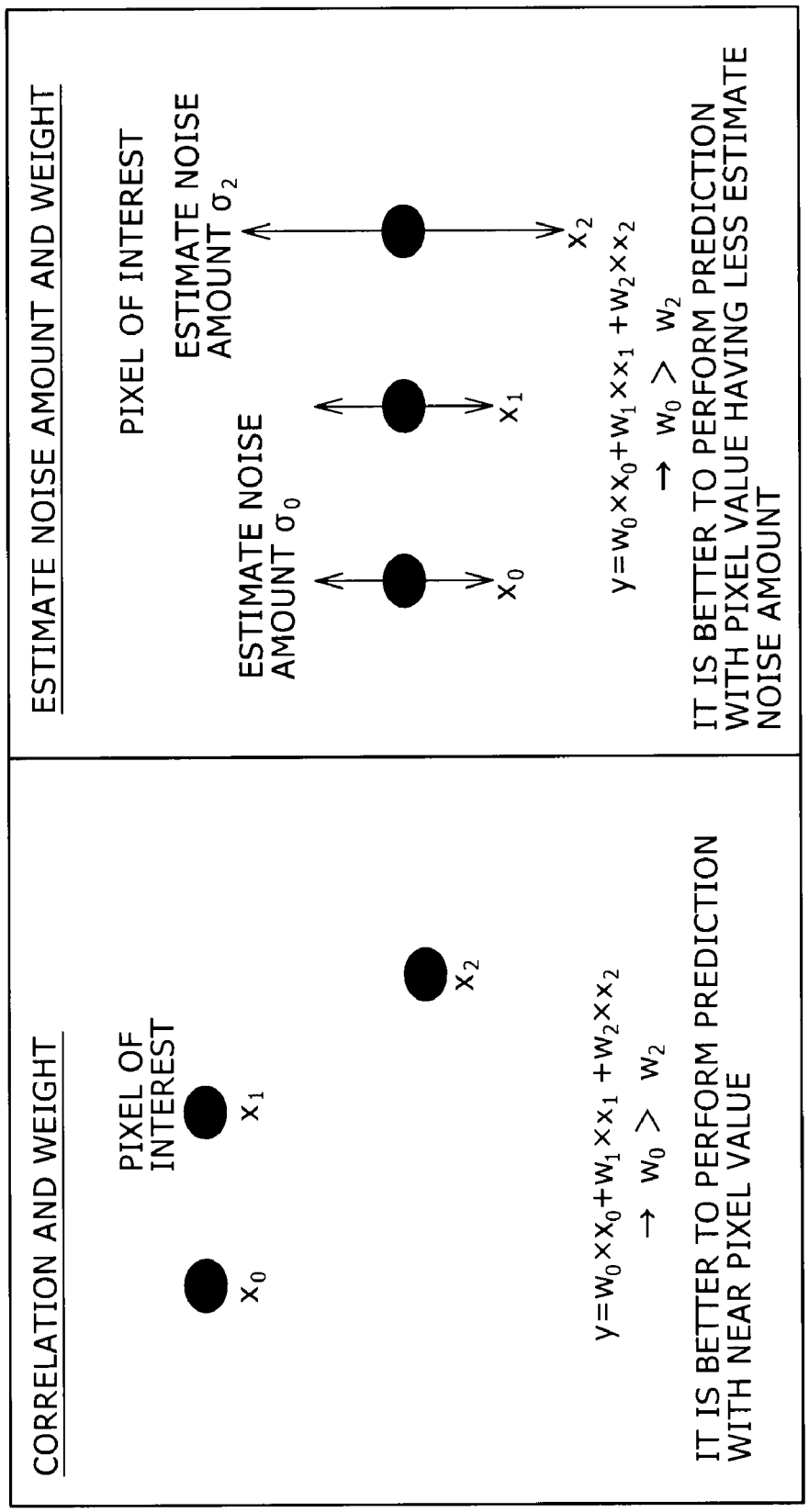
FIG. 3 is a diagram explaining a norm for learning for predictive coefficients.
Figure 4:
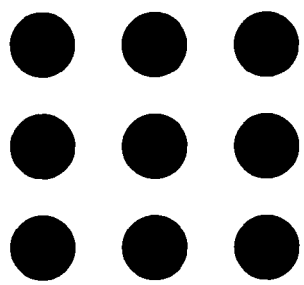
FIG. 4 is a view showing a class tap composed of pixel values of pixels of 3×3.
Figure 5:
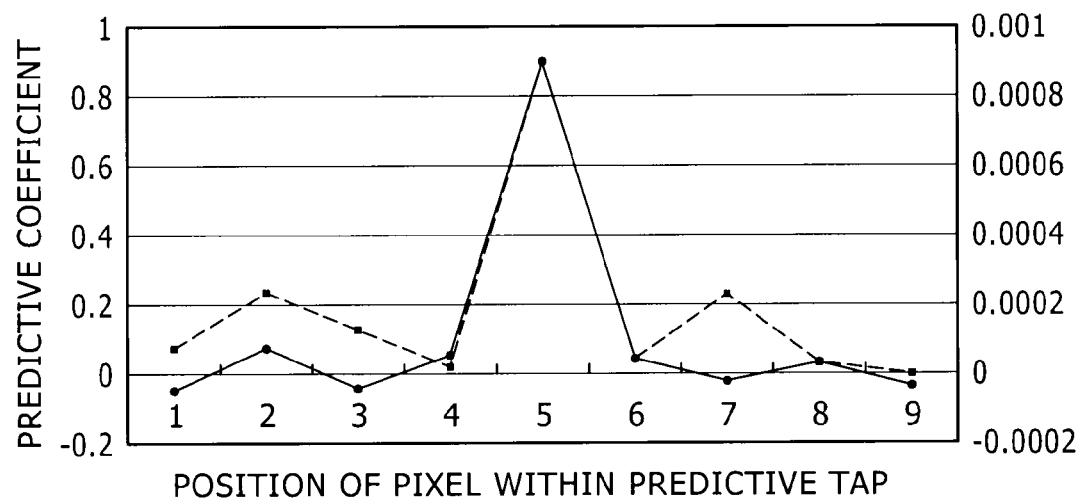
FIG. 5 is a graph showing predictive coefficients which are multiplied by pixel values composing a predictive tap.

Next, the class classifying adaptation processing executed in the image processing apparatus 10 will be desired with reference to FIGS. 3 to 5.

When it is assumed that in the image processing apparatus 10 shown in FIG. 1, the predicting portion 18, for example, carries out a linear predictive arithmetic operation as a predetermined predictive arithmetic operation, the pixel value y composing the output image is obtained in accordance with Expression (3) as a linear expression:

$$y = WX \quad (3)$$

where X represents an n-dimensional vector ($X = (x_0, x_1, \ldots, x_n)$) consisting of the n pixel values, of the n pixels of the input image, composing the predictive tap about the pixel value y of the output image, and W represents an n-dimensional vector ($W = (w_0, w_1, \ldots, w_n)$) consisting of the predictive coefficients which are multiplied by the n pixel values of the n pixels, respectively. From the above, the number of pixels composing the predictive tap is equal to the number of predictive coefficients composing the predictive coefficient W.

However, the optical predictive coefficient W can be obtained from the learning which will be described later. However, in order to execute highly precise noise removing processing, the following two items are required as the norm for the learning thereof.

A first item is such that the predictive coefficient W is changed based on the correlation (waveform) of the predictive tap. That is to say, the first item is such that the predictive coefficient W which is multiplied by the pixel value is made large in that pixel value, nearer the pixel value of the pixel of interest, of the pixel values composing the predictive tap.

For example, as shown on a left-hand side of FIG. 3, it is assumed that the predictive tap is composed of a pixel value $x_1$ of a pixel of an input image corresponding to a position of a pixel of interest, a pixel value $x_0$ near the pixel value $x_1$, and a pixel value $x_2$ far from the pixel value $x_1$. In this case, the predictive coefficient W needs to be learned so that the pre dictive coefficient $w_0$ which is multiplied by the pixel value $x_0$ becomes larger than the predictive coefficient $w_2$ which is multiplied by the pixel value $x_2$ which is located farther from the pixel value $x_1$ than the pixel value $x_0$ is located.

In addition, a second item is such that the predictive coefficient W is changed based on the estimate noise amount σ' of the input image. That is to say, the predictive coefficient W which is multiplied by the pixel value is made large in that pixel value having the less estimate noise amount σ'.

For example, as shown on a right-hand side of FIG. 3, it is assumed that a predictive tap is composed of a pixel value $x_1$ of the pixel of the input image corresponding to the position of a pixel of interest, a pixel value $x_0$ having an estimate noise amount $\sigma_0$, and a pixel value $x_2$ having an estimate noise amount $\sigma_2$ larger than the estimate noise amount $\sigma_0$. In this case, the predictive coefficient W needs to be learned so that the predictive coefficient $w_0$ which is multiplied by the pixel value $x_0$ becomes larger than the predictive coefficient $w_2$ which is multiplied by the pixel value $x_2$ having the larger estimate noise amount $x_2$ than the estimate noise $\sigma_0$ of the pixel value $x_0$.

Cluster classification learning is known as a method of learning the optimal predictive coefficient in accordance with the norm as described above. In this case, with the cluster classification learning, the pixels of interest are classified into classes based on the correlation of the cluster tap, and the estimate noise amount σ', and the predictive coefficient is obtained every class. However, in this case, the number of classes explosively increases, so that it becomes difficult to learn the predictive coefficients. For example, when the class tap, as shown in FIG. 4, is composed of the pixel values of the pixels of 3×3, if the correlation of the class tap is represented by subjecting each of the pixel values of the pixels to the 1-bit ADRC processing, and the estimate noise amount σ' of each of the pixels is represented by 3 bits, the total number of classes becomes about $6.9 \times 10^{10}$ ($= 512 \times 8^9$).

Thus, the optimal processing coefficient for each of the classes obtained by the classification based on the correlation of the class tap is obtained in the learning which will be described later. Also, the image processing apparatus 10 optimizes that processing coefficient in correspondence to the estimate noise amount σ' in the class classification adaptation processing, and carries out the predictive arithmetic operation with the optimized processing coefficient as the predictive coefficient W.

That is to say, the maximum signification of the class classification learning is to change the value of the predictive coefficient every class. For example, as shown in FIG. 5, the predictive coefficients which are multiplied by the pixel values, respectively, within the predictive tap are different from each other in two different classes. It is noted that in FIG. 5, an axis of abscissa represents the positions of the pixels corresponding to the pixel values composing the predictive tap, and an axis of ordinate represents the predictive coefficients which are multiplied by the pixel values of the pixels, respectively.

Thus, the image processing apparatus 10 optimizes the predictive coefficients in accordance with Expression (4) similarly to the case where the predictive coefficient W is changed in correspondence to the estimate noise amount σ' based on the optimal processing coefficient for each of the classes obtained by the classification based on the correlation of the class tap obtained from the learning, thereby classify ing and learning the pixels of interest based on the correlation of the class tap, and the estimate noise amounts.

$$W \cong W_0 + \sum_{i=0}^{m} \sigma'_i W_{\sigma'i} \quad (4)$$

where $W_0$ and $W_{\sigma'i}$ are processing coefficients of an n-dimensional vector corresponding to the predictive coefficient W of the n-dimensional vector, m is the number of pixel values composing the noise amount tap, and $\sigma'_i$ is an estimate noise amount of an i-th pixel value within the noise amount tap. It is noted that the number, m, of pixel values composing the noise amount tap may be either identical to or different from the number, n, of pixel values composing the predictive tap.

In addition, Expression (4) is expressed in the form of a determinant of matrix as follows:

$$\begin{pmatrix} w_0 \\ w_1 \\ \vdots \\ w_n \end{pmatrix} \cong \begin{pmatrix} w_{0,0} \\ w_{0,1} \\ \vdots \\ w_{0,n} \end{pmatrix} + \begin{pmatrix} w_{\sigma'0,0} & \cdots & w_{\sigma'm,0} \\ w_{\sigma'0,1} & \cdots & w_{\sigma'm,1} \\ \vdots & \ddots & \vdots \\ w_{\sigma'0,n} & \cdots & w_{\sigma'm,n} \end{pmatrix} \begin{pmatrix} \sigma'_0 \\ \sigma'_1 \\ \vdots \\ \sigma'_m \end{pmatrix} \quad (5)$$

where $w_{0,0}, w_{0,1}, \ldots, w_{0,n}$ represent n elements of the processing coefficients $W_0$ of the n-dimensional vector, respectively, and $w_{\sigma i',0}, w_{\sigma i',1}, \ldots, w_{\sigma i',n}$ represent n elements of the processing coefficients $W_{\sigma i'}$, of the n-dimensional vector, respectively.

Figure 6:
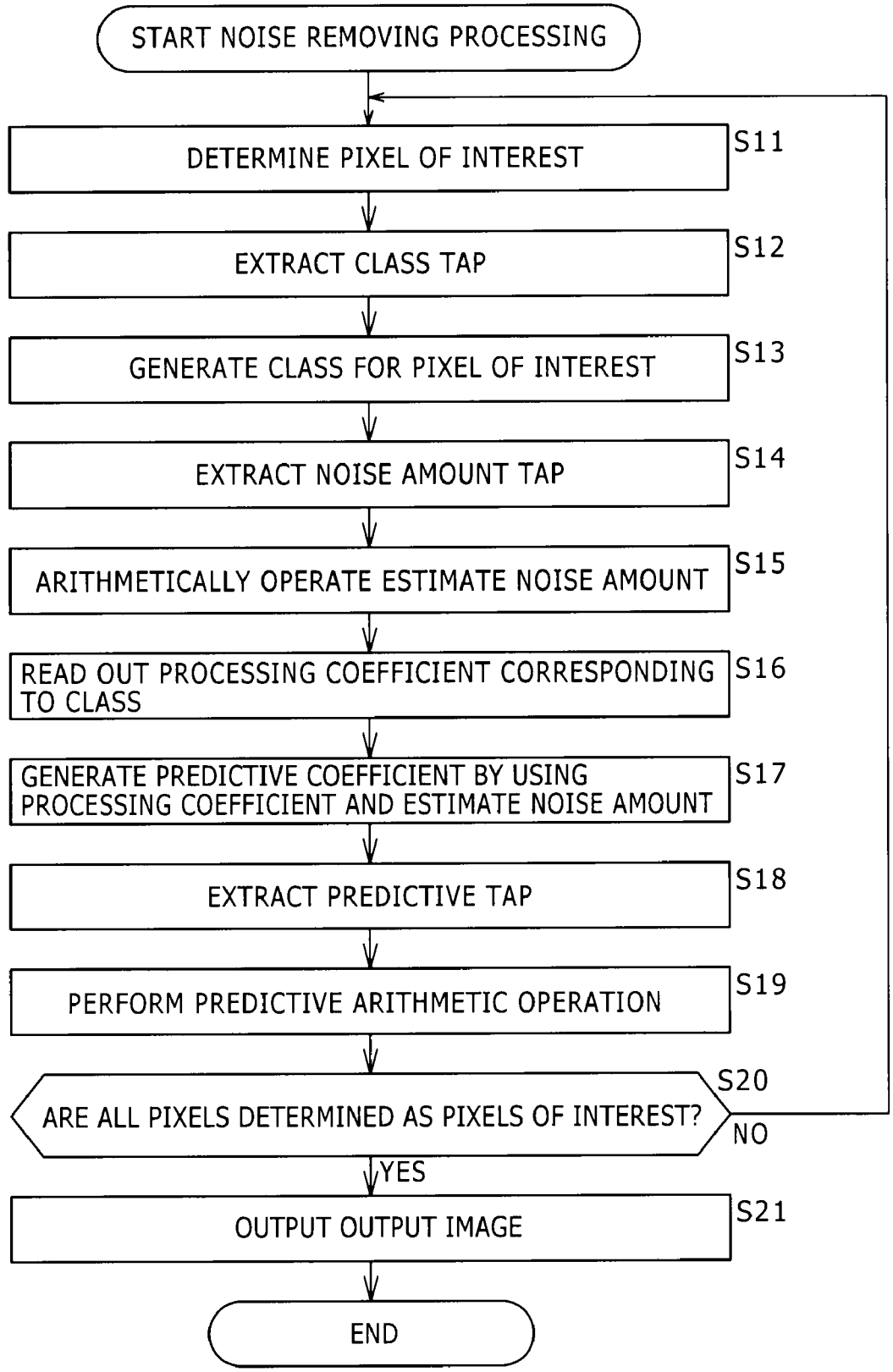
FIG. 6 is a flow chart explaining noise removing processing executed by the image processing apparatus shown in FIG. 1.

Next, the noise removing processing executed by the image processing apparatus 10 shown in FIG. 1 will be described with reference to a flow chart of FIG. 6.

Firstly, in Step S11, the class tap extracting portion 11, the noise amount tap extracting portion 14, and the predictive tap extracting portion 17 determine one, of a plurality of pixels composing the output image, which is not yet set as a pixel of interest as the pixel of interest. Next, in Step S12, the class tap extracting portion 11 extracts the class tap corresponding to the pixel of interest from the input image, and supplies the class tap thus extracted to the class classifying portion 12.

In Step S13, the class classifying portion 12 classifies the pixel of interest into the corresponding one of the classes in correspondence to the feature of the class tap supplied thereto from the class extracting portion 11, thereby generating the class for the pixel of interest. Also, the class classifying portion 12 supplies the data on the class thus generated for the pixel of interest to the coefficient storing portion 13.

In Step S14, the noise amount tap extracting portion 14 extracts the noise amount tap corresponding to the pixel of interest from the input image, and supplies the data on the noise amount tap thus extracted to the noise amount arithmetically operating portion 15. In Step S15, the noise amount arithmetically operating portion 15 arithmetically operates the estimate noise amount $\sigma'$ corresponding to the pixel of interest from the noise amount tap supplied thereto from the noise amount tap extracting portion 14 in accordance with Expression (2), and supplies the data on the resulting estimate noise amount $\sigma'$ to the predictive coefficient generating portion 16.

In Step S16, the coefficient storing portion 13 reads out the processing coefficient corresponding to the class supplied thereto from the class classifying portion 12, and supplies the processing coefficient thus read out to the predictive coefficient generating portion 16. In Step S17, the predictive coefficient generating portion 16 carries out the arithmetic operation for the matrix of Expression (5) by using the processing coefficients supplied thereto from the coefficient storing portion 13, and the estimate noise amounts $\sigma'$ supplied thereto from the noise amount arithmetically operating portion 15, thereby generating the predictive coefficient W. The predictive coefficient generating portion 16 supplies the predictive coefficient W to the predicting portion 18.

In Step S18, the predictive tap extracting portion 17 extracts the predictive tap corresponding to the pixel of interest from the input image, and supplies the data on the predictive tap thus extracted to the predicting portion 18. In Step S19, the predicting portion 18 carries out the predictive arithmetic operation for Expression (3) by using the predictive coefficient W supplied thereto from the predictive coefficient generating portion 16, and the predictive tap supplied thereto from the predictive tap extracting portion 17. As a result, the predicting portion 18 generates the predictive value for the pixel value of the pixel of interest as the pixel value of the pixel of interest composing the output image. In Step S20, the class tap extracting portion 11, the noise amount tap extracting portion 14, and the predictive tap extracting portion 17 determines whether or not all the pixels composing the output image are already determined as the pixels of interest, respectively.

It is determined in Step S20 that all the pixels composing the output image are not yet determined as the pixels of interest, respectively, the operation returns back to the processing in Step S11, and the processing described above is repeatedly executed.

On the other hand, it is determined in Step S20 that all the pixels composing the output image are already determined as the pixels of interest, respectively, in Step S21, the predicting portion 18 outputs the output image composed of the pixel values generated based on the predictive arithmetic operation, thereby completing the operation.

As described above, the image processing apparatus 10 generates the predictive coefficient W by using the processing coefficients for the respective classes obtained based on the correlation of the class tap obtained from the learning which will be described later, and the estimate noise amounts $\sigma'$. Therefore, the optimal predictive coefficient W corresponding to the correlation of the class tap, and the estimate noise amounts $\sigma'$ can be generated without explosively increasing the number of classes. As a result, the image processing apparatus 10 can execute the highly precise noise removing processing by using the predictive coefficient W, thereby generating the output image, having the high image quality, from which the luminance dependency noise is removed.

In addition, according to the experiments, an S/N ratio of the output image in the image processing apparatus 10 becomes larger than that of the output image obtained from the class classifying adaptation processing in the related art by using the predictive coefficients obtained from the learning made for the classes obtained through the classification by using the correlation of the class tap, and the estimate noise amounts $\sigma'$. For example, when the number of pixel values composing the predictive coefficient and the noise amount tap is 9, according to the experiments, the former is 36.5 and the latter is 35.6. As a result, it is understood that the image processing apparatus 10 can generate the output image having the higher image quality.

Next, a description will be given with respect to the learning for the processing coefficients used to generate the predictive coefficient W in the image processing apparatus 10.

The learning for the processing coefficients, for example, is carried out by utilizing a least-square method.

Specifically, a true value of a pixel value of a pixel of an output image in a k-th sample is represented by $y_k$, an n-dimensional vector X of an input pixel composing a predictive tap about the pixels of the output image in the k-th sample is represented by $X_k$ ($X_k=(x_{k0}, x_{k1}, \ldots, x_{kn})$), and the least-square method, for example, is adopted as the norm representing that the predictive coefficient W is the optimal one. In this case, a minimization function Q is expressed by Expression (6):

$$Q = \sum_{k=1}^{N} (y_k - WX_k)^2 \quad (6)$$

where N is the number of samples used in set learning of the pixel values $y_k$ of the output image, and an n-dimensional vector of the input image composing the predictive tap about the pixel values $y_k$ (the number of samples for the learning).

A minimum value (local minimum value) of the minimization function Q expressed by Expression (6) is given by a processing coefficient in which a value obtained by partially differentiating the minimization function Q by all variable numbers is made zero. Therefore, a linear simultaneous equation of an addition matrix shown in FIG. 7 which is structured so that the minimization function Q is partially differentiated by all the variable numbers, and the resulting value becomes zero is solved, thereby obtaining the optimal processing coefficient.

Figure 7:
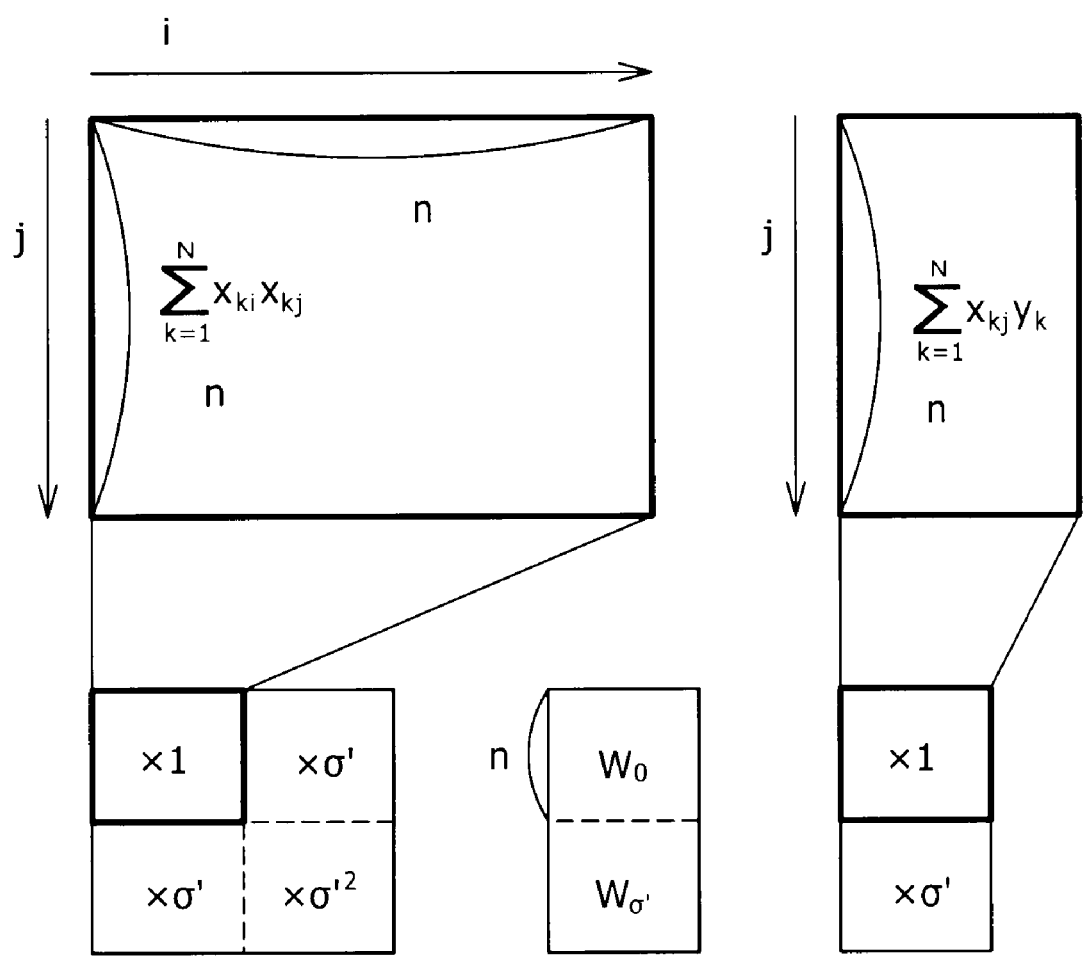
FIG. 7 is a diagram showing an addition matrix.

The addition matrix shown in FIG. 7 is divided into small blocks (small blocks each composed of a matrix of n×n in the case of a matrix of a left-hand side of a left member, and small blocks each composed of a matrix of n×1 in the case of each of a matrix of a right-hand side of a left member, and a matrix of the right member). Each of the small blocks of the matrix of the left-hand side of the left member, and the matrix of the right member is structured by multiplying elements of the addition matrix corresponding to the linear predictive arithmetic operation in the class classifying adaptation processing in the related art by the values of the estimate noise amounts σ' corresponding to the positions of the small blocks. It is noted that suffixes i and j ($0 \leq i, j \leq n$) represent the positions of the pixels corresponding to the pixel values within the predictive tap.

The addition matrix shown in FIG. 7 is generated every class and thus the optimal processing coefficient is obtained every class.

According to the class classifying adaptation processing executed by the image processing apparatus 10, the matrix arithmetic operation for Expression (5) is carried out by using the processing coefficients for the respective classes obtained in the manner described above, thereby generating the predictive coefficient W. Also, the predictive arithmetic operation for Expression (3) is carried out by using the resulting predictive coefficient W, thereby converting the input image into the output image.

Figure 8:
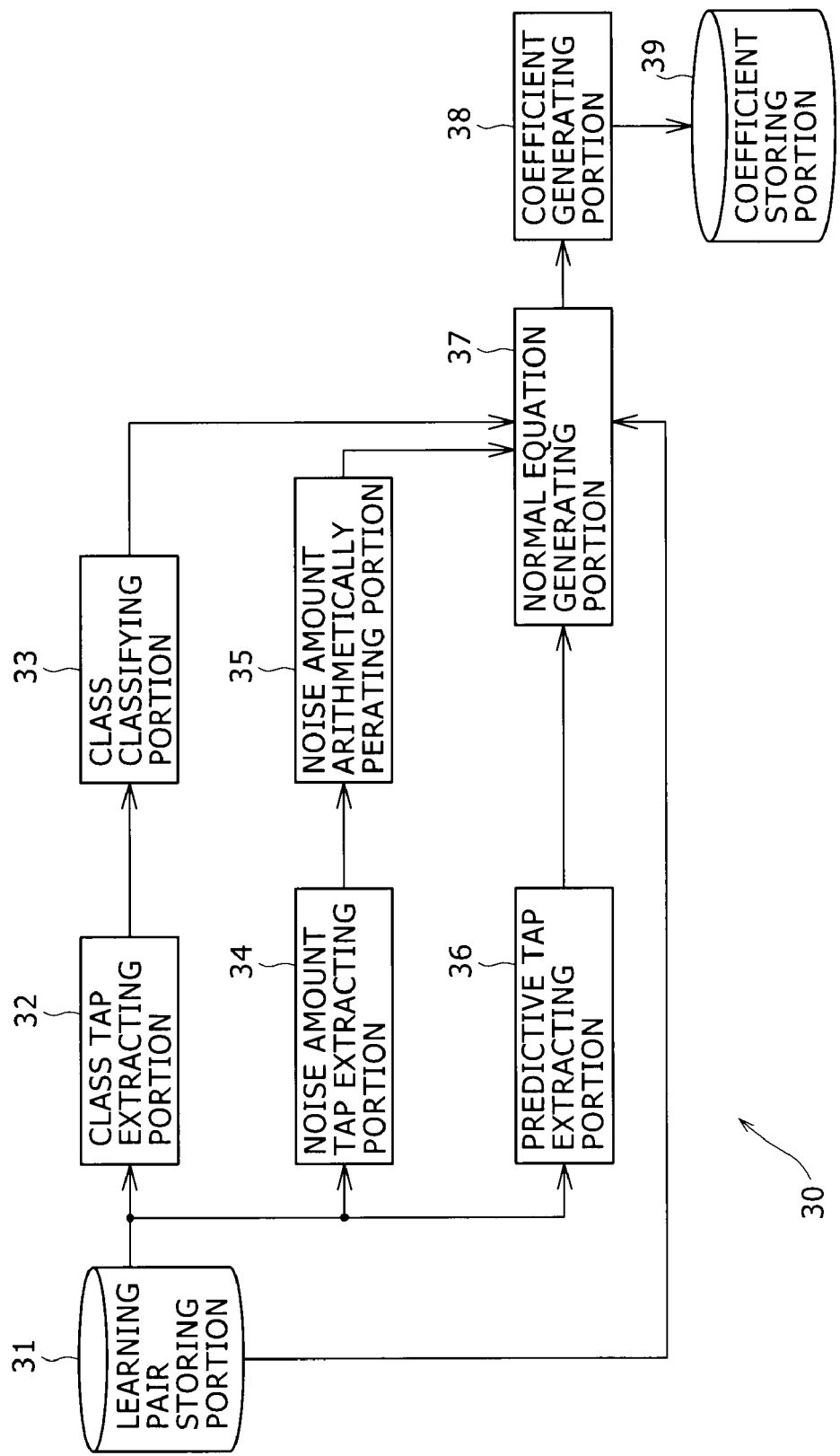
FIG. 8 is a block diagram showing a configuration of a learning apparatus for learning processing coefficients according to an embodiment of the present invention.

FIG. 8 is a block diagram showing an example of a configuration of a learning apparatus 30 for learning the processing coefficients used by the image processing apparatus 10 shown in FIG. 1.

The learning apparatus 30 shown in FIG. 8 is composed of a learning pair storing portion 31, a class tap extracting portion 32, a class classifying portion 33, a noise amount tap extracting portion 34, a noise amount arithmetically operating portion 35, a predictive tap extracting portion 36, a normal equation generating portion 37, a coefficient generating portion 38, and a coefficient storing portion 39.

In the learning apparatus 30, the learning pair storing portion 31 stores therein a set of an image containing therein a luminance dependency noise and corresponding to an input image in the image processing apparatus 10 as a student in learning for the processing coefficients (hereinafter referred to as "a student image"), and an image corresponding to an ideal output image into which the input image is converted as a teacher (hereinafter referred to as "a teacher image") in the form of a learning pair.

In addition, the learning pair storing portion 31 outputs the data on the student image of the learning pair to each of the class tap extracting portion 32, the noise amount tap extracting portion 34, and the predictive tap extracting portion 36. Also, the learning pair storing portion 31 outputs the data on the teacher image of the learning pair to the normal equation generating portion 37.

The class tap extracting portion 32 successively determines the pixels composing the teacher image as the pixels of interest similarly to the case of the class tap extracting portion 11 shown in FIG. 1. Also, the class tap extracting portion 32 extracts the pixel values of a plurality of pixels, within the student image, corresponding to the position of the pixel of interest, and the peripheral positions of the position of the pixel of interest in the form of the class tap from the student image. In this case, the pixel values of a plurality of pixels within the student image are used to classify the pixels of interest into the classes. The class tap extracting portion 32 supplies the data on the resulting class tap to the class classifying portion 33.

The class classifying portion 33 classifies the pixels of interest into the classes in correspondence to the feature of the class tap supplied thereto from the class tap extracting portion 32 similarly to the case of the class classifying portion 12 shown in FIG. 1, thereby generating the classes corresponding to the pixels of interest. The class classifying portion 33 supplies the data on the classes to the normal equation generating portion 37.

The noise amount tap extracting portion 34 successively determines the pixels composing the teacher image as the pixels of interest, respectively, the case of the class tap extracting portion 32. Also, the noise amount tap extracting portion 34 extracts the pixel values of a plurality of pixels, within the student image, corresponding to the position of the pixel of interest, and the peripheral positions of the position of the pixel of interest in the form of the noise amount tap from the student image similarly to the case of the noise amount tap extracting portion 14 shown in FIG. 1. In this case, the pixel values of a plurality of pixels within the student image are used to arithmetically operate the estimate noise amount σ' corresponding to the pixel of interest. The noise amount tap extracting portion 34 supplies the data on the noise amount tap thus extracted to the noise amount arithmetically operating portion 35.

The noise amount arithmetically operating portion 35 arithmetically operates the estimate noise amount σ' corresponding to the pixel of interest from the noise amount tap supplied thereto from the noise amount tap extracting portion 34 in accordance with Expression (2) similarly to the case of the noise amount arithmetically operating portion 15 shown in FIG. 1. Also, the noise amount arithmetically operating portion 35 supplies the data on the estimate noise amount σ' corresponding to the pixel of interest to the normal equation generating portion 37.

The predictive tap extracting portion 36 successively determines the pixels composing the teacher image as the pixels of interest, respectively, similarly to the case of each of the class tap extracting portion 32, and the noise amount tap extracting portion 34. Also, the predictive tap extracting portion 36 extracts the pixel values of a plurality of pixels within the student image corresponding to the position of the pixel of interest, and the peripheral positions of the position of the pixel of interest as the predictive tap from the student image similarly to the case of the predictive tap extracting portion 17 shown in FIG. 1. In this case, the pixel values of a plurality of pixels within the student image are used to predict the pixel of interest. Also, the predictive tap extracting portion 36 supplies the data on the predictive tap thus extracted to the normal equation generating portion 37.

The normal equation generating portion 37 generates the addition matrix (refer to FIG. 7) in the form of the normal equation. In this case, the addition matrix is obtained by performing the addition by using the estimate noise amount σ' supplied from the noise amount arithmetically operating portion 35, the predictive tap supplied from the predictive tap extracting portion 36, and the teacher image inputted from the learning pair storing portion 31 every class supplied from the class classifying portion 33.

Specifically, the normal equation generating portion 37 substitutes the pixel values of the student image composing the predictive tap in the k-th sample as $X_k$ ($X_k=(x_{k0}, x_{k1}, \ldots, x_{kn})$) into the addition matrix shown in FIG. 7 for the classes. In addition, the normal equation generating portion 37 substitutes the pixel values of the pixel of interest of the teacher image in the k-th sample in the form of $y_k$ into the addition matrix shown in FIG. 7. Also, the normal equation generating portion 37 substitutes the estimate noise amounts σ' corresponding to the pixels of interest, respectively, into the addition matrix shown in FIG. 7. As a result, the normal equation generating portion 37 generates the normal equation.

It is noted that the addition matrix, as described above, is such that the minimization function Q expressed by Expression (6) is made zero. Therefore, it can be the that the normal equation generated by the normal equation generating portion 37 is an equation for solving an expression corresponding to Expression (3) for generation of the teacher image based on the multiplication of the predictive coefficient W obtained from both the estimate noise amounts σ' and the processing coefficients, and the predictive tap of the student image, thereby obtaining the processing coefficients. The normal equation generated from the normal equation generating portion 37 is supplied to the coefficient generating portion 38.

The coefficient generating portion 38 solves the normal equation supplied thereto from the normal equation generating portion 37, thereby generating the processing coefficients. Also, the coefficient generating portion 38 instructs the coefficient storing portion 39 to store therein the processing coefficients thus generated. The processing coefficients which are learned in the manner as described above, and are then stored in the coefficient storing portion 39 are stored in the coefficient storing portion 13 shown in FIG. 1, and are used in the image processing apparatus 10.

Figure 9:
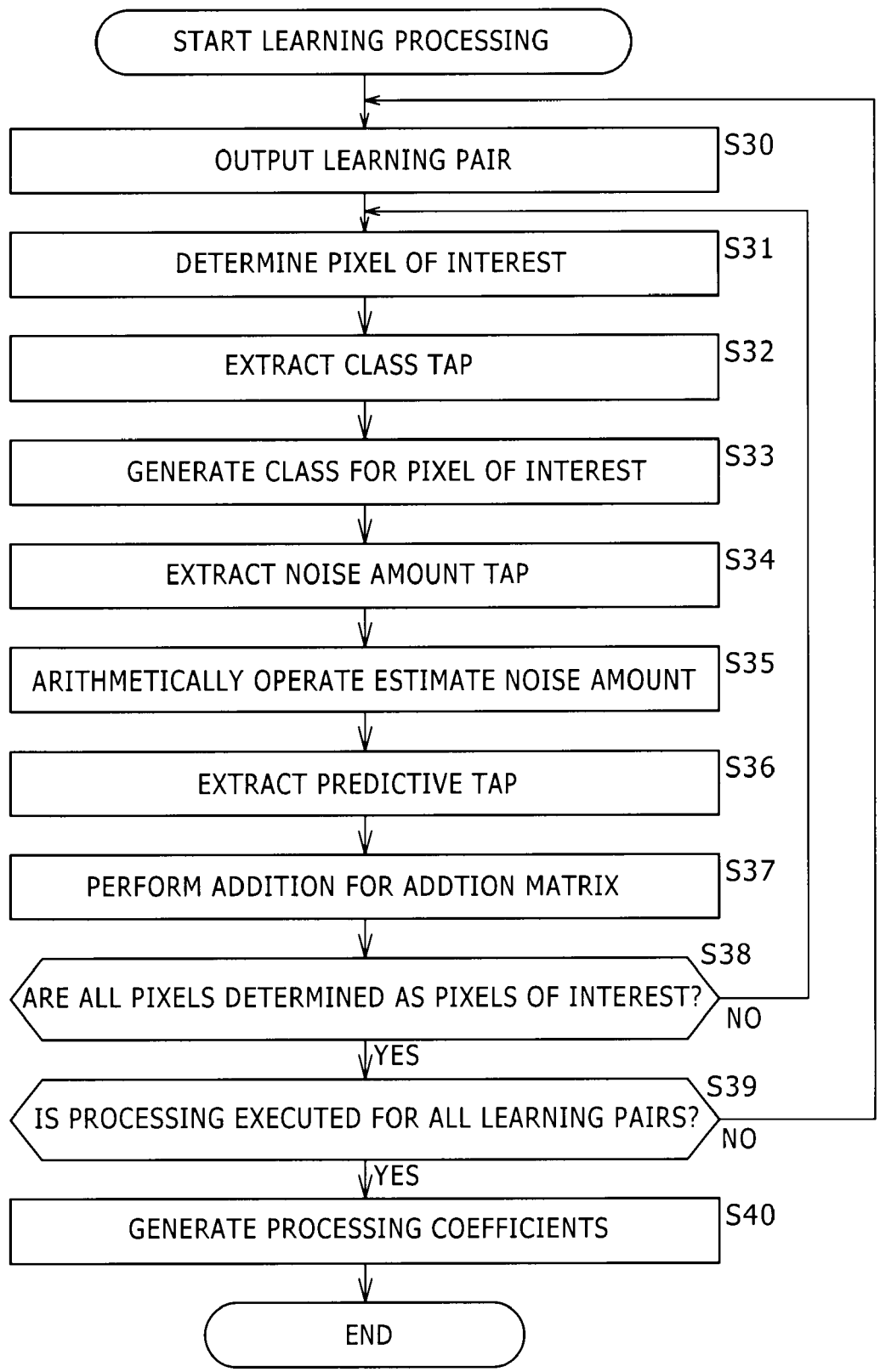
FIG. 9 is a flow chart explaining the learning processing executed by the learning apparatus shown in FIG. 8.

Next, learning processing executed by the learning apparatus 30 shown in FIG. 8 will be described with reference to a flow chart of FIG. 9.

Firstly, in Step S30, the learning pair storing portion 31 outputs the learning pair which is not yet outputted of the learning pairs stored therein. Specifically, the learning pair storing portion 31 inputs the data on the student image of the learning pair to each of the class tap extracting portion 32, the noise amount tap extracting portion 34, and the predictive tap extracting portion 36. On the other hand, the learning pair storing portion 31 inputs the data on the teacher image of the learning pair to the normal equation generating portion 37.

Next, in Step S31, the class tap extracting portion 32, the noise amount tap extracting portion 34, and the predictive tap extracting portion 36 determine one of the pixels, of a plurality of pixels composing the teacher image, which are not yet determined as the pixels of interest as the pixel of interest similarly to the case of the class tap extracting portion 11 shown in FIG. 1.

In Step S32, the class tap extracting portion 32 extracts the class tap corresponding to the pixel of interest from the student image, and supplies the data on the class tap thus extracted to the class classifying portion 33. In Step S33, the class classifying portion 33 classifies the pixel of interest into the corresponding one of the classes in correspondence to the feature of the class tap supplied thereto from the class tap extracting portion 32 similarly to the case of the class classifying portion 12 shown in FIG. 1, thereby generating the class for the pixel of interest. The class classifying portion 33 supplies the data on the class thus generated to the normal equation generating portion 37.

In Step S34, the noise amount tap extracting portion 34 extracts the noise amount tap corresponding to the pixel of interest from the student image, and supplies the data on the noise amount tap thus extracted to the noise amount arithmetically operating portion 35 similarly to the case of the noise amount tap extracting portion 14 shown in FIG. 1.

In Step 35, the noise amount arithmetically operating portion 35 arithmetically operates the estimate noise amount σ' corresponding to the noticed image from the noise amount tap supplied thereto from the noise amount tap extracting portion 34 in accordance with Expression (2) similarly to the case of the noise amount arithmetically operating portion 15 shown in FIG. 1. Also, the noise amount arithmetically operating portion 35 supplies the data on the estimate noise amount σ' to the normal equation generating portion 37.

In Step S36, the predictive tap extracting portion extracts the predictive tap corresponding to the pixel of interest from the student image similarly to the case of the predictive tap extracting portion 17 shown in FIG. 1, and supplies the data on the predictive tap thus extracted to the normal equation generating portion 37.

In Step S37, the normal equation generating portion carries out the addition for the addition matrix every class supplied thereto from the class classifying portion (refer to FIG. 7) by using the estimate noise amounts σ' supplied thereto from the noise amount arithmetically operating portion 35, the predictive tap supplied thereto from the predictive tap extracting portion 36, and the teacher image inputted thereto from the learning pair storing portion 31.

In Step S38, the class tap extracting portion 32, the noise amount tap extracting portion 34, and the predictive tap extracting portion 36 determine whether or not all the pixels composing the teacher image are already determined as the pixels of interest. When it is determined in Step S38 that all the pixels composing the teacher image are not yet determined as the pixels of interest, the operation returns back to the processing in Step S31, and the processing described above is repeatedly executed.

On the other hand, when it is determined in Step S38 that all the pixels composing the teacher image are already determined as the pixels of interest, in Step S39, the learning pair storing portion 31 determines whether or not the processing from Step S30 to Step S38 is already executed for all the learning pairs, that is, whether or not all the learning pairs stored therein are already outputted. When it is determined in Step S39 that the processing from Step S30 to Step S38 is not yet executed for all the learning pairs, the operation returns back to the processing in Step S30, and the processing described above is repeatedly executed.

On the other hand, when it is determined in Step S39 that all the learning pairs stored therein are already outputted, the normal equation generating portion 37 supplies the data on the normal equation generated by carrying out the addition in Step S37 to the coefficient generating portion 38.

Also, in Step S40, the coefficient generating portion 38 generates the processing coefficients by solving the normal equation supplied thereto from the normal equation generating portion 37, and instructs the coefficient storing portion 39 to store therein the processing coefficients.

As described above, the learning apparatus 30 learns the optimal processing coefficient every class obtained by the classification based on the correlation of the class tap by using the student image containing therein the luminance dependency noise, and the teacher image, as the ideal image, from which the luminance dependency noise is removed. Therefore, the image processing apparatus 10 generates the predictive coefficient W by using the optimal processing coefficients and the estimate noise amounts $\sigma'$, thereby making it possible to generate the optimal predictive coefficient W, for removal of the luminance dependency noise, corresponding to the correlation of the class tap, and the estimate noise amounts $\sigma'$ without explosively increasing the number of classes. As a result, the image processing apparatus 10 can generate the output image, having the high image quality, from which the luminance dependency noise is removed.

It is noted that although in the above description, the noticed images are classified into the classes in correspondence to the correlation of the class tap, the noticed images may not be classified.

Next, a series of processing described above can be executed by either the hardware or the software. When the series of processing described above is executed by the software, a program composing the software is installed from a program recording medium either in a computer incorporated in a dedicated hardware, or, for example, in a general purpose personal computer or the like which can execute various functions by installing therein various programs.

FIG. 10 shows an example of a configuration of the hardware in a computer 300 for executing the series of processing described above in accordance with a program.

In the computer 300, a Central Processing Unit (CPU) 301, a Read Only Memory (ROM) 302, and a Random Access Memory (RAM) 303 are connected to one another through a bus 304.

In addition, an I/O interface 305 is connected to the bus 304. An input portion 306, an output portion 307, a storing portion 308, a communication portion 309, and a drive 310 are also connected to the I/O interface 305. In this case, the input portion 306 is composed of a receiving portion or the like for receiving an instruction transmitted thereto from a keyboard, a mouse, and a microphone, a remote controller, or the like. The output portion 307 is composed of a display device, a speaker or the like. The storing portion 308 is composed of a hard disc, a nonvolatile memory or the like. Also, the drive 310 drives a removable media 311 as a package media. In this case, the removable media 311 is composed of a magnetic disc (including a flexible disc), an optical disc (such as a Compact Disc-Read Only Memory (CD-ROM), or a Digital Versatile Disc (DVD)), a magneto optical disc, or a semiconductor memory.

With the computer 300 configured in the manner as described above, the CPU 301 loads the program, for example, stored in the storing portion 308 into the RAM 303 through the I/O interface 305 and the bus 304, thereby executing the series of processing described above.

The program which the CPU 301 of the computer 300 executes, for example, is recorded in the removable media 311, or is provided through a wired or wireless transmission medium such as a Local Area Network (LAN), the Internet or a digital satellite-based broadcasting.

Also, the program can be installed in the storing portion 308 through the I/O interface 305 by equipping the drive 310 with the removable media 311. In addition, the program can be received at the communication portion 309 through the wired or wireless transmission media to be installed in the storing portion 308. In addition thereto, the program can be previously installed either in the ROM 302 or in the storing portion 308.

It is noted that the program which the CPU 301 of the computer 300 executes may be either a program in accordance with the processing is executed in a time series manner so as to follow the order explained in this specification, or a program in accordance with which the processing is executed at a necessary timing when a call is made.

In addition, the embodiment of the present invention is by no means limited to the embodiments described above, and various changes thereof can be made without departing from the gist of the present invention.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus for converting a first image into a second image having higher image quality than that of the first image, comprising:

first means for extracting a plurality of pixel values, within the first image, corresponding to a position of a pixel of interest and peripheral positions of the position of the pixel of interest within the second image;

means for obtaining estimate noise amounts for the plurality of pixel values extracted by the first means for extracting, respectively;

means for generating second processing coefficients by arithmetically operating on first processing coefficients previously learned from a normal equation and the estimate noise amounts obtained by the means for obtaining for the plurality of pixel values, respectively, within the first image, the normal equation being obtained based on a relational expression for generating a teacher image, corresponding to the second image, having higher image quality than that of a student image, corresponding to the first image, in accordance with an arithmetic operation for the second processing coefficients obtained in accordance with estimate noise amounts of pixel values within the student image, first processing coefficients, and the student image;

second means for extracting a plurality of pixel values, within the first image, corresponding to a position of a pixel of interest and peripheral positions of the position of the pixel of interest within the second image; and means for generating a pixel value of the pixel of interest within the second image in accordance with an arithmetic operation for the plurality of pixel values extracted by the second means for extracting, and the second processing coefficients.

2. The image processing apparatus according to claim 1, wherein the relational expression is an expression representing a relation in which N second processing coefficients are obtained in accordance with a matrix arithmetic operation for N estimate noise amounts obtained from the pixel values of N pixels, within the student image, corresponding to the position of the pixel of interest and the peripheral positions of the position of the pixel of interest within the teacher image, and the first processing coefficients expressed in a form of a matrix of N×N, and the pixels of interest within the teacher image are generated in accordance with a linear combination of the N second processing coefficients, and the pixel values of the N pixels within the student image.

3. The image processing apparatus according to claim 1, wherein an estimate noise amount for each respective pixel value extracted by the first means for extracting is obtained in a form of a quadratic expression of the pixel value within the student image.

4. The image processing apparatus according to claim 1, further comprising
means for generating a class for the pixel of interest in accordance with a feature of a class tap composed of the plurality of pixel values, within the first image, corresponding to the position of the pixel of interest and the peripheral positions of the position of the pixel of interest within the second image;
wherein the means for generating second processing coefficients generates the second processing coefficients in accordance with an arithmetic operation for the first processing coefficients, of the class generated by the means for generating a class, of the first processing coefficients for classes previously learned from a normal equation for the classes, and the estimate noise amounts for the plurality of pixel values within the first image.

5. An image processing method for use in an image processing apparatus for converting a first image into a second image having higher image quality than that of the first image, the image processing method comprising:
extracting a plurality of pixel values, within the first image, corresponding to a position of a pixel of interest and peripheral positions of the position of the pixel of interest within the second image;
obtaining estimate noise amounts for the plurality of pixel values, respectively;
generating second processing coefficients by arithmetically operating on first processing coefficients previously learned from a normal equation and the estimate noise amounts obtained by the obtaining for the plurality of pixel values, respectively, within the first image, the normal equation being obtained based on a relational expression for generating a teacher image, corresponding to the second image, having higher quality than that of a student image, corresponding to the first image, in accordance with an arithmetic operation for the second processing coefficients obtained in accordance with estimate noise amounts of pixel values within the student image, first processing coefficients, and the student image;
extracting a plurality of pixel values, within the first image, corresponding to a position of a pixel of interest and peripheral positions of the position of the pixel of interest within the second image; and
generating a pixel value of the pixel of interest within the second image in accordance with an arithmetic operation for the plurality of pixel values thus extracted, and the second processing coefficients.

6. A non-transitory computer-readable storage medium storing instructions thereon which, when executed by a computer, cause the computer to perform an image processing method for converting a first image into a second image having higher image quality than that of the first image, the method comprising:
extracting a plurality of pixel values, within the first image, corresponding to a position of a pixel of interest and peripheral positions of the position of the pixel of interest within the second image;
obtaining estimate noise amounts for the plurality of pixel values, respectively;
generating second processing coefficients by arithmetically operating on first processing coefficients previously learned from a normal equation and the estimate noise amounts obtained by the obtaining for the plurality of pixel values, respectively, within the first image, the normal equation being obtained based on a relational expression for generating a teacher image, corresponding to the second image, having higher quality than that of a student image, corresponding to the first image, in accordance with an arithmetic operation for the second processing coefficients obtained in accordance with estimate noise amounts of pixel values within the student image, first processing coefficients, and the student image;
extracting a plurality of pixel values, within the first image, corresponding to a position of a pixel of interest and peripheral positions of the position of the pixel of interest within the second image; and
generating a pixel value of the pixel of interest within the second image in accordance with an arithmetic operation for the plurality of pixel values thus extracted, and the second processing coefficients.

7. A learning apparatus, comprising:
means for obtaining estimate noise amounts from pixel values within a student image containing therein a noise having noise dependency, obtaining second processing coefficients by arithmetically operating on the obtained estimate noise amounts and first processing coefficients, and generating a normal equation by using the pixel values of the student image, and pixel values of a teacher image, in order to solve a relational expression for generating the teacher image having higher image quality than that of the student image, in accordance with an arithmetic operation for the second processing coefficients and the student image; and
means for generating the first processing coefficients by solving the normal equation.

8. The learning apparatus according to claim 7, wherein the relational expression is an expression representing a relation in which N second processing coefficients are obtained in accordance with a matrix arithmetic operation for the estimate noise amounts obtained from the pixel values of N pixels, within the student image, corresponding to a position of a pixel of interest and peripheral positions of the position of the pixel of interest within the teacher image, and the first processing coefficients expressed in a form of a matrix of N×N, and the pixels of interest within the teacher image are generated in accordance with a linear combination of the N second processing coefficients, and the pixel values of the N pixels within the student image.

9. The learning apparatus according to claim 7, wherein an estimate noise amount for each respective pixel value of the student image is obtained in a form of a quadratic expression of the pixel value within the student image.

10. The learning apparatus according to claim 7, further comprising
means for generating a class for the pixel of interest in accordance with a feature of a class tap composed of the plurality of pixel values, within the student image corresponding to the position of the pixel of interest and the peripheral positions of the position of the pixel of interest within the teacher image;

wherein the means for obtaining generates the normal equation for every class generated by the means for generating a class by using the pixel values of the student image, and the pixel value of the pixel of interest.

11. An image processing apparatus for converting a first image into a second image having higher image quality than that of the first image, comprising:

a first pixel value extracting section configured to extract a plurality of pixel values, within the first image, corresponding to a position of a pixel of interest and peripheral positions of the position of the pixel of interest within the second image;

an estimate noise amount arithmetically operating section configured to obtain estimate noise amounts for the plurality of pixel values extracted by the first pixel value extracting section, respectively;

a processing coefficient generating section configured to generate second processing coefficients by arithmetically operating on first processing coefficients previously learned from a normal equation and the estimate noise amounts obtained by the estimate noise amount arithmetically operating section for the plurality of pixel values, respectively, within the first image, the normal equation being obtained based on a relational expression for generating a teacher image, corresponding to the second image, having higher image quality than that of a student image, corresponding to the first image, in accordance with an arithmetic operation for the second processing coefficients obtained in accordance with estimate noise amounts of pixel values within the student image, first processing coefficients, and the student image;

a second pixel value extracting section configured to extract a plurality of pixel values, within the first image, corresponding to a position of a pixel of interest and peripheral positions of the position of the pixel of interest within the second image; and a predicting section configured to generate a pixel value of the pixel of interest within the second image in accordance with an arithmetic operation for the plurality of pixel values extracted by the second pixel value extracting section, and the second processing coefficients.

12. A learning apparatus, comprising:

a normal equation generating section configured to obtain estimate noise amounts from pixel values within a student image containing therein a noise having noise dependency, obtaining second processing coefficients by arithmetically operating on the obtained estimate noise amounts and first processing coefficients, and generating a normal equation by using the pixel values of the student image, and pixel values of a teacher image, in order to solve a relational expression for generating the teacher image having higher image quality than that of the student image, in accordance with an arithmetic operation for the second processing coefficients and the student image; and a coefficient generating section configured to generate the first processing coefficients by solving the normal equation.

\* \* \* \* \*